May 22, 1956            S. LUBKIN            2,746,295
APPARATUS FOR MEASURING AND RECORDING PRESSURES
INDICATED BY MANOMETER TUBES
Filed Dec. 12, 1951            2 Sheets-Sheet 1

INVENTOR
SAMUEL LUBKIN
BY
Davis, Hoxie & Faithfull
ATTORNEYS

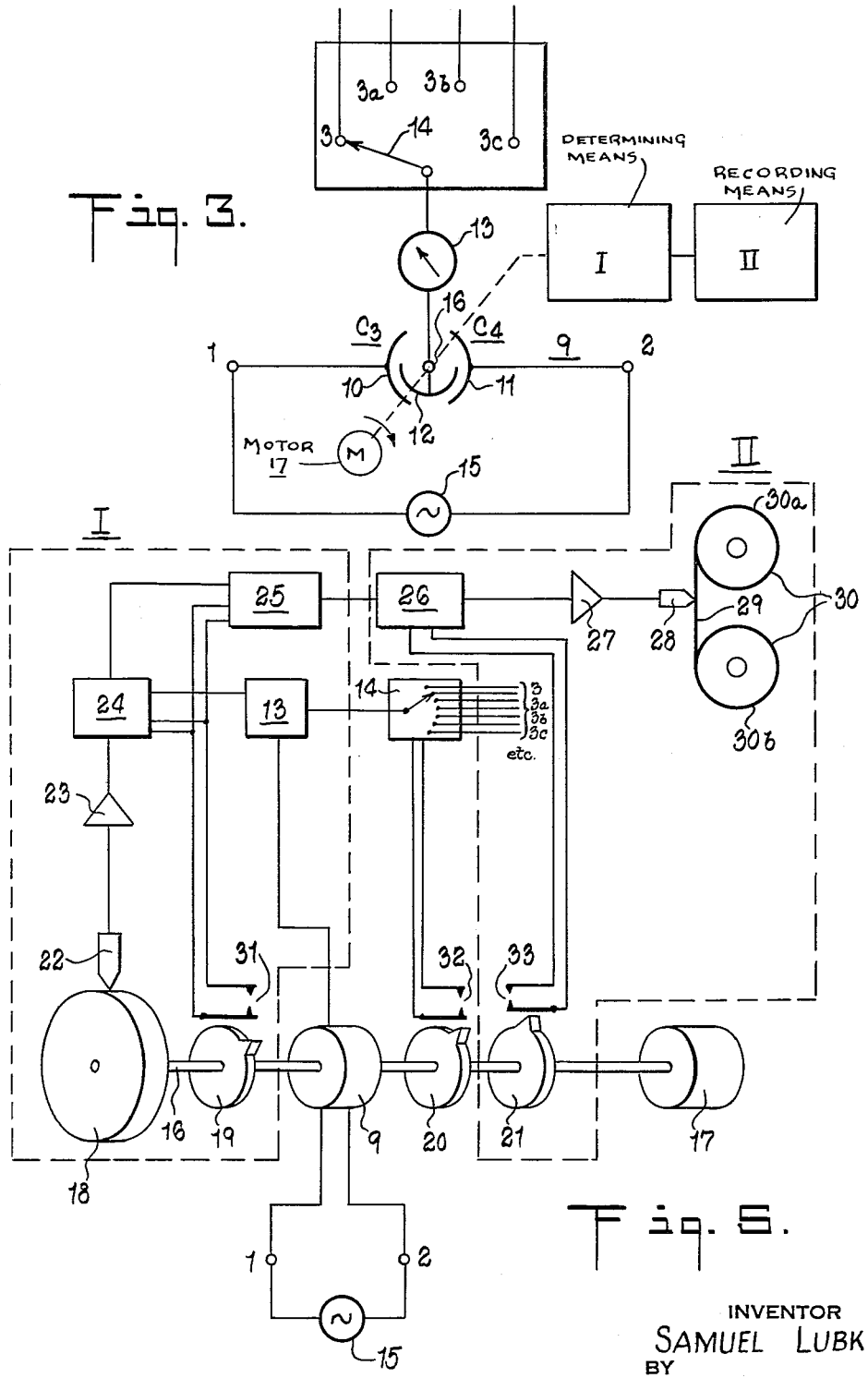

United States Patent Office 2,746,295
Patented May 22, 1956

2,746,295

APPARATUS FOR MEASURING AND RECORDING PRESSURES INDICATED BY MANOMETER TUBES

Samuel Lubkin, Brooklyn, N. Y., assignor, by mesne assignments, to Underwood Corporation, New York, N. Y., a corporation of Delaware Application December 12, 1951, Serial No. 261,227

5 Claims. (Cl. 73—398)

This invention relates to pressure measurement devices, and more particularly to apparatus for rapidly measuring and recording variations in pressures as indicated by manometers.

In various applications, particularly those associated with aerodynamic research, it is necessary to read a number of manometers within a comparatively short interval, and to record the results of these readings. Visual observation and manual recording of this data is often inconvenient, particularly when there are numerous instruments or when the readings must be repeated at frequent intervals. Photographic recording of the manometer indications overcomes some of the objections associated with visual observation and manual recording; however, the processing of the photo sensitive material is expensive, troublesome and time consuming. The photographic method may also introduce an appreciable time delay between the time of photographing and the time when the results are available in usable form, the resulting time lag making this method worthless for many applications. This invention overcomes these difficulties.

Therefore, it is the primary object of this invention to provide improved apparatus for rapidly measuring and recording differential pressures.

Another object of the invention is to provide apparatus for automatically recording differential pressure measurements.

An additional object of the invention is to provide differential pressure measuring and recording apparatus that compensates for variations in volume of the pressure indicating medium.

Still another object of the invention is to provide apparatus that converts differential pressure measurements into discrete electrical signals.

Briefly the invention comprises apparatus that rapidly measures and records pressure changes as indicated by a manometer or a plurality of manometers. Each manometer consists of a U-shaped non-conducting tube filled with an electrically conducting fluid. Conductive coatings are coupled directly to the outer circumferences of the two branches of the U-shaped tube to define, in combination with the electrically conducting fluid, a first and a second condenser respectively. The non-conducting U-shaped tube serves as the dielectric for the condenser. A variable capacitor having a movable element provides a third and a fourth condenser, the movable element varying the capacitances of these latter condensers. The first and second arms of a capacitance bridge is formed by the first and second condensers, and the third and fourth arms by the third and fourth condensers respectively. One end of a null detector is connected to the movable element, suitable coupling means connecting the other end of the null detector to the junction of the first and second condensers. An oscillator supplies the required AC signal for the bridge circuit. Determining means and recording means continuously measure and record respectively, the displacement of the movable element at the instant bridge balance is achieved, the displacement being proportional to the magnitude of the pressure measured at the instant of bridge balance.

An advantage of this invention is that manometer readings are sensed electronically. The intelligence thus obtained is available for instant reading and for recording and appears in a form which facilitates its conversion into coded electrical signals for transmission to remote points.

Other objects and advantages of this invention will be readily appreciated as the device becomes better understood by reference to the following detailed description when considered in connection with the accompanying drawings wherein:

Fig. 3 is a schematic view of one embodiment of my invention arranged for reading a plurality of manometers;

Fig. 5 is a detailed schematic view of one embodiment of my invention arranged for reading a plurality of manometers.

Figure 1:
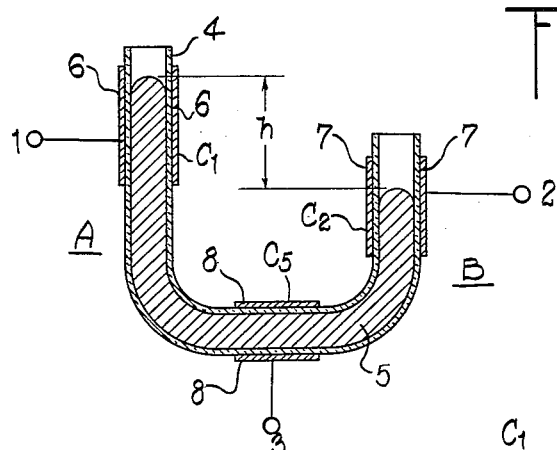
Fig. 1 is a cross-sectional view of a manometer showing the position of the electrical connections.

In Fig. 1, a manometer comprises a U-shaped tube 4 which has two upright branches A and B, and a rounded elbow portion. The open ends of said tube 4 communicate with a standard or known source of pressure and an unknown source of pressure respectively. The interior of the tube 4 is filled partially with a conducting fluid 5 such as mercury or the like. The outer circumferences of the two branches A and B are coated with conductive coatings 6 and 7, the coatings being connected electrically to terminals 1 and 2 respectively. A capacitive means electrically couples the fluid 5 in the region of the elbow portion, to a terminal shown at 3 (as will be explained later, terminal 3 is connected to one end of a null detector 13). In the embodiment here illustrated the coupling means is capacitive and comprises a conductive coating 8 applied to the exterior surface of the tube in the region of the elbow portion. It will be understood however that any coupling means can be used. For example, an electrode may be sealed in the tube 4, the electrode making the necessary electrical contact with the conductive fluid 5. The conductive coatings 6, 7 and 8 can be of metal or graphite or the like; in the embodiment herein illustrated silver coatings were used throughout.

Figure 2:
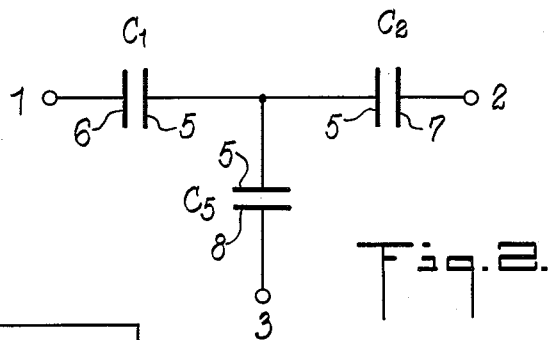
Fig. 2 is the equivalent electrical circuit of the manometer shown in Fig. 1.

Each cylindrical coating 6, 7 and 8 forms one plate of a capacitor, the conductive fluid 5 in the tube forming a common plate which, together with each of the coatings, define capacitors $C_1$, $C_2$, and $C_5$ respectively. The dielectric for the latter capacitors is the material of U-shaped tube 4. The electrical equivalent circuit is shown in Fig. 2. As the mercury level changes, the magnitude of capacitances $C_1$ and $C_2$ will change proportionately in opposite senses; the magnitude of capacity $C_5$ will of course remain substantially constant since there will be no change in the length of the mercury column within the cylindrical coating 8.

In order to insure a linear relationship between capacitors $C_1$ and $C_2$, as the registry of meniscii change in response to pressure variations, it is important that the coatings 6 and 7 be of predetermined length, such that the permissible mercury level rise will never be beyond their respective top portions. The mercury level in the tube 4 at mean pressure will be at the middle of the coatings 6 and 7. It will be understood of course that the invention is not so restricted, it being equally possible to practice the invention by using a non-linear relationship between $C_1$ and $C_2$, the difference being one of convenience only.

As is well known, capacitance varies directly as the area of the dielectric and inversely as the thickness of the dielectric. Expressed mathematically:

$$C = \frac{FKA}{t} \quad (1)$$

Where $C$ = capacitance in microfarads
$F$ = a constant of proportionality
$K$ = dielectric constant of the dielectric
$A$ = area of dielectric in sq. cm.
$t$ = thickness of dielectric in centimeters As the pressure being measured varies from its mean value, the mercury in one branch of the tube will rise, while the mercury in the other branch will fall, the capacitance progressively increasing in the branch containing the rising mercury column, and progressively decreasing in the other branch. The change in capacitance will be obvious from a study of Formula 1, the rising mercury column increasing the length (and hence the area) of the dielectric between the electrodes, and conversely a falling mercury column progressively decreases the area of the dielectric. In a non-linear adaptation of the invention, when the mercury column rises beyond the top of a coating, the capacity will remain substantially constant.

The differential height $h$ (Fig. 1) between the meniscii levels in the branch arms is a function of the pressure being measured, and hence, the ratio of the capacities $C_1$ and $C_2$ is also a function of the pressure being measured. A form of capacitance bridge is used to conveniently measure the ratios $C_1:C_2$ of a manometer or a plurality of manometers. As will be explained presently, a manometer (or a plurality of manometers) having the physical connections shown in Figs. 1 and 2, is electrically connected with additional circuit elements to form the capacitance bridge.

Fig. 3 shows schematically how manometer readings can be determined and recorded and how the capacity ratios for several manometers may be quickly obtained. The terminals 3, 3a, 3b, 3c etc. are coupled to a plurality of manometers and are arranged in any convenient fashion. A stepping switch 14 is provided for making contact successively with the terminals 3, 3a, 3b etc. of each manometer respectively. The corresponding electrodes 1 and 2 of the several manometers are electrically connected to common binding posts 1 and 2 of Figs. 3, 4 and 5.

In series with the stepping switch 14 is a null detector 13. The detector 13 can be any device that detects the null point in a balanced bridge circuit. A source of A. C. potential 15 is connected across the electrodes 1 and 2 to supply the necessary A. C. signal to the bridge. In the embodiment illustrated, potential source 15 is a high frequency oscillator. A variable capacitor having a moveable element is indicated at 9. This capacitor comprises two symmetrical stator sections 10 and 11, the moveable element being a rotor plate 12 mounted for rotation on shaft 16. The shaft 16 is driven by the continuously rotating motor 17. The stator sections 10 and 11 are connected to terminals 1 and 2 respectively. Variable capacitor 9 forms two condensers $C_3$ and $C_4$, the former being defined by stator section 10 and rotor plate 12, and the latter by stator section 11 and rotor 12. As will be evident, rotation of the rotor section 12 will change the capacitance of $C_3$ and $C_4$ in opposite senses, clockwise rotation for example will increase the capacitance of $C_3$ and decrease that of $C_4$. The amount of rotation of shaft 16 is ascertained by the determining means I and is recorded by the recording means II.

Figure 4:
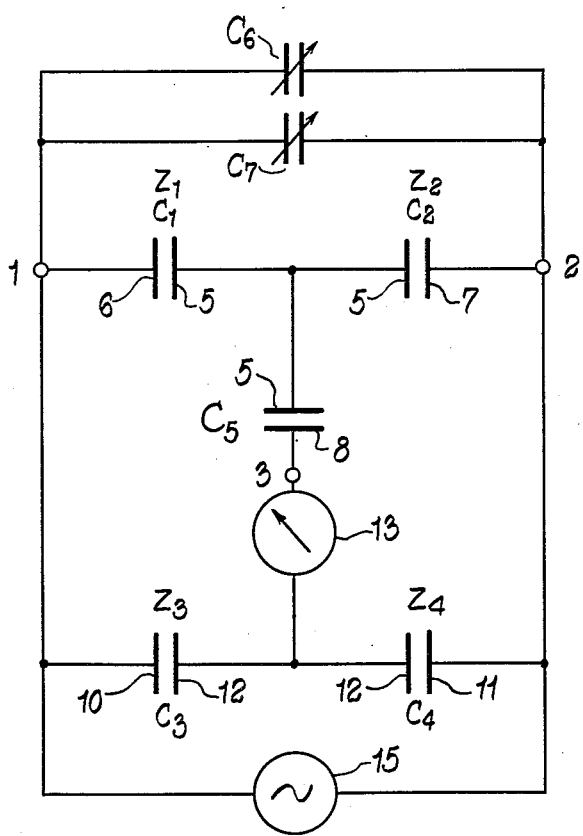
Fig. 4 is the equivalent electrical circuit corresponding to Fig. 3.

Fig. 4 shows the electrically equivalent circuit for the embodiment shown schematically in Fig. 3. The two branches A and B of the U-tube 4, having capacities $C_1$ and $C_2$ form first and second arms of the bridge respectively, while the variable capacitor 9 provides capacitors $C_3$ and $C_4$, respectively the third and fourth bridge arms. As previously explained the capacity $C_5$ formed at the elbow region of the U-shaped tube 4 remains substantially constant in magnitude; this latter capacity does not affect bridge balance since it is in series with the null detector 13 and therefore does not appear in any of the four arms of the bridge. The impedances of the capacitors $C_1$, $C_2$, $C_3$ and $C_4$ are respectively represented by $Z_1$, $Z_2$, $Z_3$, and $Z_4$.

As will be explained later in greater detail, in the operation of the device the stepping switch 14 is sequentially advanced to contact points 3, 3a, 3b, and 3c, so as to place the first and second arms of each manometer successively in circuit relation with the third and fourth arms. The rotor 12 of the variable condenser 9 is continuously rotating (as by a motor for example) to change the capacitance of $C_3$ and $C_4$ so that at some point within 180° of revolution the null indicator 13 will indicate bridge balance. Expressed mathematically:

$$\frac{Z_2}{Z_1} = \frac{Z_4}{Z_3} = \frac{C_1}{C_2} = \frac{C_3}{C_4}$$

The ratio $$\frac{C_1}{C_2}$$

is then translated in terms of angular displacement of the rotor 12, to enable the particular pressure to be determined as will be explained in connection with the description of Fig. 5.

A complete system for automatically reading a plurality of manometers in accordance with this invention is schematically illustrated in Fig. 5. This system includes means for translating successive angular displacements of the shaft 16 into recorded values of the corresponding pressures. In the drawing the determining means and the recording means are indicated generally at I and II respectively.

A continuously running motor 17 drives shaft 16 upon which the variable condenser 9 is mounted. The shaft 16 also carries a magnetic drum 18 and cams 19, 20 and 21 positioned in spaced relation longitudinally along the shaft, these cams actuating cam contacts 31, 32 and 33 respectively. The magnetic drum 18 has a series of magnetized spots equally spaced around its periphery.

In operating the system, stepping switch 14 is initially set to connect the first manometer (at 3) into the bridge circuit, and the angular position of the shaft 16 is assumed initially to be such that the variable condenser 9 is at the beginning of its normal range of operation. A reading or sensing head 22 is positioned in close relation to the circumference of the drum 18, so that as shaft 16 rotates current pulses are induced in the head 22 successively by each of the magnetized spots as they pass the head 22. The pulse signals induced in the head 22 pass through the switching circuits 24 after being amplified by the amplifier 23. The chain of amplified pulses is fed to an electronic counter 25, the number of pulses registered by the counter at any instant of time being a measure of the angular displacement of the shaft 16 from its starting reference point; since the variable condenser 9 is driven by the same shaft 16, the reading of the counter 25 is also indicative of the position of the capacitor rotor 12 (Figs. 3 and 4.)

The null detector 13 actuates the switching circuits 24 to interrupt the flow of signal pulses to the counter 25 when balance is achieved in the bridge circuit, either by the detector output falling to zero or to some critical minimum level.

The switching circuits 24 include a trigged device such as a flip flop circuit having two stable states, so that once the trigger circuit is interrupted, it remains in that state until placed in the reset state by the closing of the cam contacts 31. Thus the pulse signals to the counter 25 are interrupted when bridge balance is achieved, and are not resumed during the balance of that particular revolution of the shaft 16. In other words, the shaft 16 begins to rotate from a reference point; somewhere during the course of revolution of the shaft 16, a balance is achieved, for example at an angular displacement of 72°. The pulses to counter 25 are interrupted, and will remain so through the following 288° of shaft revolution. The reading of the counter 25 after half a revolution of the shaft 16 (180° being the total useful range of the variable condenser 9), will therefore be a measure of the condenser position at the time of balance, and hence of the pressure to be measured by the manometer as previously explained.

During the second half revolution (i. e. remaining 180° of revolution) of the shaft 16, the data registered by the counter 25 is recorded, the stepping switch 14 is advanced to the next position to connect the next manometer in the bridge circuit; the electronic counter 25 is now reset to zero and reconnected to the reading or sensing head 22. These operations are accomplished in the following manner:

During the second 180° of revolution, cam 21 revolves forcing cam contacts 33 closed to operate switching circuits 26. The switching circuits 26 connect the output of the electronic counter 25 to a set of recording heads 28 which record the reading of the counter 25 in one or more parallel channels on a magnetic tape 29. The tape 29 is fed from a supply reel 30a, to a take up reel 30b by a conventional tape driving means (not shown). Actuating means are provided for moving the stepping switch sequentially from contact to contact. In the embodiment here illustrated, the actuating means comprises cam contacts 32 and cam 20. As cam 20 revolves, cam contacts 32 are pressed closed, thereby actuating stepping switch 14 thus causing it to move to the next contact point. In this manner the first and second arms of each manometer of the purality, are connected successively to the third and fourth arms of the bridge circuit. Cam 19 also revolves, to close contacts 31 which are electrically connected with the switching circuits 24 and the electronic counter 25. The closing of contacts 31 clears the counter 25 to zero, and resets the trigger circuit of the switching circuits 24, so that signal pulses from the reading or sensing head 22 can again enter the counter 25.

The exact timing of the closing of the cam contacts 31, 32, and 33 is not critical, although it is obvious that contacts 33 should close before contacts 31 in order to record the reading of the counter 25 before the latter is cleared. If magnetized spots are placed around the entire circumference of the drum, signals will start actuating the counter immediately after closing of contacts 31, and the latter must therefore be timed to operate exactly at the beginning of the normal operating range of the variable condenser 9.

Alternatively, spots may be placed around one half of the drum periphery corresponding to the operating range of the condenser; in this instance, contacts 31 may be timed to operate at any time between the operation of contacts 33 and the beginning of the normal operating range of the condenser.

As previously explained the coatings 6, 7 (Fig. 1) are applied to the U-shaped tube 4, so that the mercury 5 will not rise above their top portions. However, if the mercury is permitted to rise above the top, several modifications of the system are in order. As will be evident, as the mercury 5 rises above the top of a coating, the capacitance of that particular branch becomes constant, and the system is non-linear. A calibration chart can be constructed and used with such a system by observing the angular position of the shaft 16 for various pressure differentials.

If this is not desired, the last mentioned system may be converted into a linear system by the proper choice of plate shapes for the stator 10 and 11 and the rotor 12 of the variable condenser 9, so that the angular position of the shaft 16 is proportional to the pressure ratio to be determined.

Since the measurement involves the ratio of capacities $C_1$ and $C_2$, gross differences in thickness or quality of glass in the manometer tube 4 will cancel out. Non-uniformity along the tube 4 may cause errors, but these errors can be corrected by cutting a channel in the coating along the tube, the width of the channel varying suitably so that the capacity per unit length will be constant.

In a practical system for reading a plurality of manometers, it sometimes happens that the conducting fluid (mercury) is accidentally spilled. In such cases, more than likely, replacement of the spilled fluid will mean that a change has been effected in the total volume of fluid within the tube. The effect of changing the fluid volume is physically equivalent to a thermal expansion or contraction of the fluid, either results in a raising or a lowering of the fluid levels in both upright branches A and B. To compensate for this condition and any other local mechanical deviations from the norm a calibrating condenser $C_6$ (Fig. 4) is shunted across the first and second arms of the capacitance bridge.

Temperature changes in the manometer dimensions or in the dielectric constant produce compensating errors which balance out. However, the thermal expansion or contraction of the mercury will not balance out, but may be effectively neutralized by means of temperature compensating condenser $C_7$ (Fig. 4) which is connected in parallel with the first and second arms of the bridge circuit. Capacitor $C_7$ is of the variable type, and has a negative temperature coefficient so that a rise in temperature decreases its capacitance and vice versa.

If desired, $C_6$ and $C_7$ (Fig. 4) can be replaced by a single condenser shunted across $C_1$ and $C_2$. With a single capacitor, however, a compromise must be made between the corrections required for mechanical reasons (neutralized by $C_7$) and those required by thermal considerations (neutralized by $C_7$). Thus, a single condenser does not allow the fine adjustment permitted by the two capacitors $C_6$ and $C_7$.

Thus this invention overcomes the disadvantages of the prior art by rapidly measuring and recording differential pressures automatically; by compensating for variations in the volume of the pressure indicating medium; and by converting differential pressure measurements into discrete electrical signals to facilitate transmission and utilization of the signals.

Other modifications of this invention may be utilized if desired. For example, the variable capacitor 9 may form one rather than two arms of a capacitor bridge, and the oscillator 15 and null detector 13 may also be interchanged.

Obviously many modifications and variations of the present invention are possible in the light of the above teachings. It is therefore to be understood that within the scope of the appended claims the invention may be practiced otherwise than as specifically described.

I claim:

1. Apparatus for rapidly measuring and recording differential pressures by means of a non-conductive manometer tube having first and second branches and containing a conductive fluid comprising: a first conductive coating on the outer circumference of said first branch, said first conductive coating and said conductive fluid comprising a first capacitor; a second conductive coating on the outer circumference of said second branch, said second conductive coating and said conductive fluid comprising a second capacitor; coupling means connected to said conductive fluid; a variable capacitor having first and second stators and a common rotor, said first stator and said common rotor comprising a third capacitor, said second stator and said common rotor comprising a fourth capacitor, said capacitors being connected together to form a bridge circuit; a null detector to indicate bridge circuit balance connecting said coupling means to said rotor; a rotatable shaft mechanically coupled to said rotor, means to rotate said shaft, the rotation of said shaft varying the capacitances of said third and fourth capacitors in opposite senses, the amount of rotation of said shaft from a predetermined reference position to balance said bridge circuit being indicative of the differential pressure measurement; determining means connected to said shaft and responsive to said null detector to ascertain the amount of rotational movement of said shaft required to balance said bridge circuit; and recording means connected to said determining means to record the ascertained amount, the recorded data being indicative of the differential pressure ascertained.

2. Apparatus for rapidly measuring and recording differential pressures by means of a manometer including a non-conductive manometer tube having first and second upright branches connected by a rounded elbow portion and containing a conductive fluid comprising: a first conductive coating on the outer circumference of said first branch, said first conductive coating and said conductive fluid comprising a first capacitor; a second conductive coating on the outer circumference of said second branch, said second conductive coating and said conductive fluid comprising a second capacitor; a third conductive coating on the outer circumference of said elbow portion, said third conductive coating and said conductive fluid comprising a coupling capacitor; a variable capacitor having first and second stators and a common rotor, said first stator and said common rotor comprising a third capacitor, said second stator and said common rotor comprising a fourth capacitor, said capacitors being connected together to form a bridge circuit; a null detector connecting said coupling capacitor to said rotor; a rotatable shaft mechanically coupled to said rotor, means to rotate said shaft, the rotation of said shaft varying the capacitances of said third and fourth capacitors in opposite senses, determining means connected to said shaft and responsive to a balanced bridge circuit condition detected by said null detector to ascertain the amount of rotational movement of said shaft from a predetermined reference position; and recording means connected to said determining means to record the ascertained amount, the recorded data being indicative of the differential pressure measured by said manometer.

3. Apparatus for rapidly measuring and recording differential pressures by means of a manometer including a non-conductive manometer tube having first and second branches and containing a conductive fluid comprising: a first conductive coating on the outer circumference of said first branch, said first conductive coating and said conductive fluid comprising a first capacitor; a second conductive coating on the outer circumference of said second branch, said second conductive coating and said conductive fluid comprising a second capacitor; coupling means connected to said conductive fluid; a variable capacitor having first and second stators and a common rotor, said first stator and said common rotor comprising a third capacitor, said second stator and said common rotor comprising a fourth capacitor, said capacitors being connected together to form a bridge circuit; a null detector to indicate bridge circuit balance connecting said coupling means to said rotor; a rotatable shaft mechanically coupled to said rotor, means to rotate said shaft cyclically, the rotation of said shaft varying the capacitances of said third and fourth capacitors in opposite senses; the amount of rotation of said shaft in each cycle from a predetermined reference position to balance said bridge circuit being indicative of said differential pressure measurement; a generator connected to said shaft to generate a series of signals, the number of said signals generated being proportional to the amount of rotation of said shaft from said predetermined reference position; a counter to count the number of said signals generated; a switching circuit connecting said generator to said counter when said shaft is at said predetermined reference position, said switching circuit being actuated by said null detector to disconnect said generator from said counter when bridge circuit balance is achieved, the number of said signals counted by said counter being indicative of the differential pressure measured by said manometer; automatic recording means connected to said counter to record the indicated data; and means for resetting said counter after the recording of the indicated data and before the beginning of the next cycle.

4. Apparatus for rapidly measuring and recording differential pressures by means of a manometer including a non-conductive manometer tube having first and second branches and containing a conductive fluid comprising: a first conductive coating on the outer circumference of said first branch, said first conductive coating and said conductive fluid comprising a first capacitor; a second conductive coating on the outer circumference of said second branch, said second conductive coating and said conductive fluid comprising a second capacitor; coupling means connected to said conductive fluid; a variable capacitor having first and second stators and a common rotor, said first stator and said common rotor comprising a third capacitor, said second stator and said common rotor comprising a fourth capacitor, said capacitors being connected together to form a bridge circuit; a null detector to indicate bridge circuit balance connecting said coupling means to said rotor; a shaft mechanically coupled to said rotor, means to rotate said shaft continuously, the rotation of said shaft varying the capacitances of said third and fourth capacitors in opposite senses; the amount of rotation of said shaft in each cycle of rotation from a predetermined reference position to balance said bridge circuit being indicative of the differential pressure measurement; a drum mounted on said shaft having equally spaced magnetized spots along its circumference, a sensing head positioned in close relation with said drum circumference, the rotation of said shaft generating a series of signals in said sensing head, the number of signals generated being proportional to the amount of rotation of said shaft; a counter to count the number of signals generated; a switching circuit connecting said generator to said counter when said shaft is at a position related to the predetermined reference position, said switching circuit being actuated by said null detector to disconnect said generator from said counter when bridge circuit balance is achieved, the number of said signals counted by said counter in each cycle of rotation being indicative of the differential pressure measured by said manometer; automatic recording means connected to said counter to record the indicated data; and means for resetting said counter after the recording of the data and before the next cycle of rotation.

5. Apparatus for rapidly measuring and recording differential pressures by means of non-conductive manometer tubes each having first and second branches and each containing a conductive fluid comprising: a first conductive coating on the outer circumference of each of said first branches, said first conductive coatings and said conductive fluid of each of said manometers comprising a plurality of first capacitors; a second conductive coating on the outer circumference of each of said second branches, said second conductive coatings and said conductive fluid of each of said manometers comprising a plurality of second capacitors; coupling means connected to the conductive fluid of each of said manometers; a variable capacitor having first and second stators and a common rotor, said first stator and said common rotor comprising a third capacitor, said second stator and said common rotor comprising a fourth capacitor, said capacitors being connected together to form a plurality of bridge circuits; a null detector to indicate bridge circuit balance; selecting means sequentially connecting said coupling means of each of said manometers to said rotor; a rotatable shaft mechanically coupled to said rotor, means to rotate said shaft continuously, the rotation of said shaft varying the capacitances of said third and fourth capacitors in opposite senses; the amount of rotation of said shaft from a predetermined reference position to balance said bridge circuit being indicative of said differential pressure measurement; a generator connected to said shaft to generate a series of signals, the number of signals generated being proportional to the amount of rotation of said shaft; a counter to count the number of signals generated; a switching circuit connecting said generator to said counter when said shaft is at said predetermined reference position, said switching circuit being actuated by said null detector to disconnect said generator from said counter when bridge circuit balance is achieved, the number of signals counted by said counter being indicative of the differential pressures measured by said manometers; recording means connected to said counter to record the number of signals counted, the recorded data being indicative of the differential pressures measured; and means for resetting the counter after the data is recorded and before said predetermined reference position is reached.

References Cited in the file of this patent

UNITED STATES PATENTS

| | | |
|---|---|---|
| Re. 22,637 | Keinath | Apr. 24, 1945 |
| 1,167,677 | Campbell et al. | Jan. 11, 1916 |
| 2,018,431 | Wolf | Oct. 22, 1935 |
| 2,357,023 | Reid et al. | Aug. 29, 1944 |
| 2,618,157 | Keeling | Nov. 18, 1952 |
| 2,651,204 | Dickinson | Sept. 8, 1953 |

FOREIGN PATENTS

| | | |
|---|---|---|
| 574,873 | Germany | Apr. 21, 1933 |
| 626,217 | Great Britain | Sept. 22, 1947 |

OTHER REFERENCES

Industrial Temperature Instrument Employing Electronic Methods and Devices, C. O. Fairchild, pub. in Instruments, vol. 17, Aug. 1944, pp. 468–472.